(12) United States Patent
Laschinger et al.

(10) Patent No.: US 11,288,091 B2
(45) Date of Patent: Mar. 29, 2022

(54) DYNAMIC ORCHESTRATION IN A MIRCROSERVICE ARCHITECTURE

(71) Applicant: SAP SE, Walldorf (DE)

(72) Inventors: Christian Laschinger, Leimen (DE); Tobias Weller, Buseck (DE); Christoph Lenschow, Walldorf (DE)

(73) Assignee: SAP SE, Walldorf (DE)

( * ) Notice: Subject to any disclaimer, the term of this patent is extended or adjusted under 35 U.S.C. 154(b) by 195 days.

(21) Appl. No.: 16/702,168

(22) Filed: Dec. 3, 2019

(65) Prior Publication Data

US 2021/0165680 A1    Jun. 3, 2021

(51) Int. Cl.
*G06F 9/48*        (2006.01)
*G06F 9/455*      (2018.01)
*G06F 9/54*        (2006.01)

(52) U.S. Cl.
CPC ........ *G06F 9/4843* (2013.01); *G06F 9/45558* (2013.01); *G06F 9/546* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| 2016/0124742 | A1 | 5/2016 | Rangasamy et al. |
| 2018/0276040 | A1* | 9/2018 | Hosmani ................. G06F 9/50 |
| 2019/0197448 | A1 | 6/2019 | Nelaturi et al. |
| 2019/0220321 | A1 | 7/2019 | Yang |
| 2019/0317776 | A1* | 10/2019 | Walsh ................... G06N 20/00 |
| 2020/0409825 | A1* | 12/2020 | Balasubramanian ....... G06F 16/90335 |

OTHER PUBLICATIONS

European Application No. 20208555.1; European Search Report dated Apr. 16, 2021.

* cited by examiner

*Primary Examiner* — Lewis A Bullock, Jr.
*Assistant Examiner* — Melissa A Headly
(74) *Attorney, Agent, or Firm* — Erise IP, P.A.

(57) ABSTRACT

Systems, methods, and computer program products are described for orchestrating communication between containers or microservices of a multi-container architecture. Data having a plurality of tasks and associated dependencies among the plurality of tasks is received. A dependency graphs is generated that correlates each dependency of the associated dependencies with a plurality of microservices. Each microservice is configured to execute a task of the plurality of tasks. Each task is distributed, based on the generated dependency graph, to a respective microservice for execution. A plurality of messages are sequentially received from the plurality of microservices. Each message includes an output of each microservice for a respective task. Output data having a combination of the output of each microservice is provided for further characterization.

15 Claims, 9 Drawing Sheets

DYNAMIC ORCHESTRATION IN A MIRCROSERVICE ARCHITECTURE

TECHNICAL FIELD

The subject matter described herein relates to enhanced techniques for orchestrating communication between containers of a multi-container architecture.

BACKGROUND

Software applications can use a number of different architectures such as a service-oriented or microservice architecture. With a microservice architecture, an application can be defined as a collection of related services or microservices. Applying a microservice architecture to complex software products can help decouple and/or structure software code, and at the same time allow individual scaling of each microservice. The interaction between applications and microservices is known as orchestration. With orchestration, a set of predefined paths or rules can be used to facilitate communication between services (e.g., if-then-else statements). As software code becomes more sophisticated, the use of such predefined paths can become increasingly complex as the number of paths or rules can increase exponentially. These rules may conflict with each other and require manual de-confliction. Additionally, such rules may not handle dynamic changes in an application.

SUMMARY

In one aspect, data including a plurality of tasks and associated dependencies among the plurality of tasks is received. A dependency graph is generated that correlates each dependency of the associated dependencies with a plurality of microservices. Each microservice is configured to execute a task of the plurality of tasks. Each task is distributed, based on the generated dependency graph, to a respective microservice for execution. A plurality of messages are sequentially received from the plurality of microservices. Each message includes an output of each microservice for a respective task. Output data having a combination of the output of each microservice for is provided for further characterization. In some variations, the generating and distributing can be repeated until each task of the plurality of tasks is completed by the identified microservice. In other variations, the repeating can occur after receipt of each message is sequentially received from each microservice.

In some variations, the generated dependency graph can include a plurality of nodes. Each node representing each microservice. A first dependency can be determined between a first node and a second node of the plurality of nodes. The first node can be dependent on the second node. At a first time, a task of the plurality of tasks can be distributed to the second node. At a second time after completion of the task by the second node, another task can be distributed to the first node.

In other variations, the plurality of microservice can include at least one instance of a microservice. Scaling instances of the at least one instance can occur by instantiating additional instances of at least one microservice when a portion of the plurality of tasks exceeds operational limits of the at least one microservice or removing at least one microservice after a respective task is executed. An additional instance of at least one microservice can be instantiated when an output is not received within a predetermined time period.

In another aspect, a system can include a message dispatcher component and a graph builder component. The message dispatcher component is configured to receive data comprising a plurality of tasks and associated dependencies among the plurality of tasks. The graph builder component is configured to generate a dependency graph correlating each dependency of the associated dependencies with a plurality of microservice. Each microservice is configured to execute a task of the plurality of tasks. The message dispatcher component is further configured to (i) distribute each task, based on the generated dependency graph, to a respective microservice for execution, (ii) sequentially receive, from the plurality of microservices, a plurality of messages, each message comprising an output of each microservice for a respective task, and (iii) provide output data comprising a combination of the output of each microservice for further characterization.

In some variations, the generated dependency graph can include a plurality of nodes, each node representing each microservice. The message dispatcher can be further configured to: determine a first dependency between a first node and a second node of the plurality of nodes, distribute, at a first time, a task of the plurality of tasks to the second node, and distribute, at a second time after completion of the task by the second node, another task to the first node. The first node can be dependent on the second node.

In other variations, the plurality of microservice can include at least one instance of a microservice. The system can further include a scaling manager configured to scale instances of the at least one instance by instantiating additional instances of at least one microservice when a portion of the plurality of tasks exceeds operational limits of the at least one microservice or removing at least one microservice after a respective task is executed. The scaling manager can also be configured to instantiate an additional instance of at least one microservice when an output is not received within a predetermined time period.

In some variations, the message dispatcher component can be further configured to repeat the generating and distributing until each task of the plurality of tasks is completed by the identified microservice. In other variations, the repeating occurs after receipt of each message is sequentially received from each microservice.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides a dynamic orchestration architecture that facilitates adding or removing worker microservices for performing a task based on a number of tasks associated with a user request. Use of this subject matter can provide a resilient architecture that can dynamically adjust to account for any failure of worker microservices by adding or removing worker microservice instances.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

A dynamic orchestration approach for communicating between microservices and an application is described herein that utilizes a central orchestration component. The central orchestration component can facilitate communication between a user and a number of microservices, as well as communication among microservices. Such communication can utilize a dependency graph that assists with maintaining the independence of each microservice.

Figure 1:
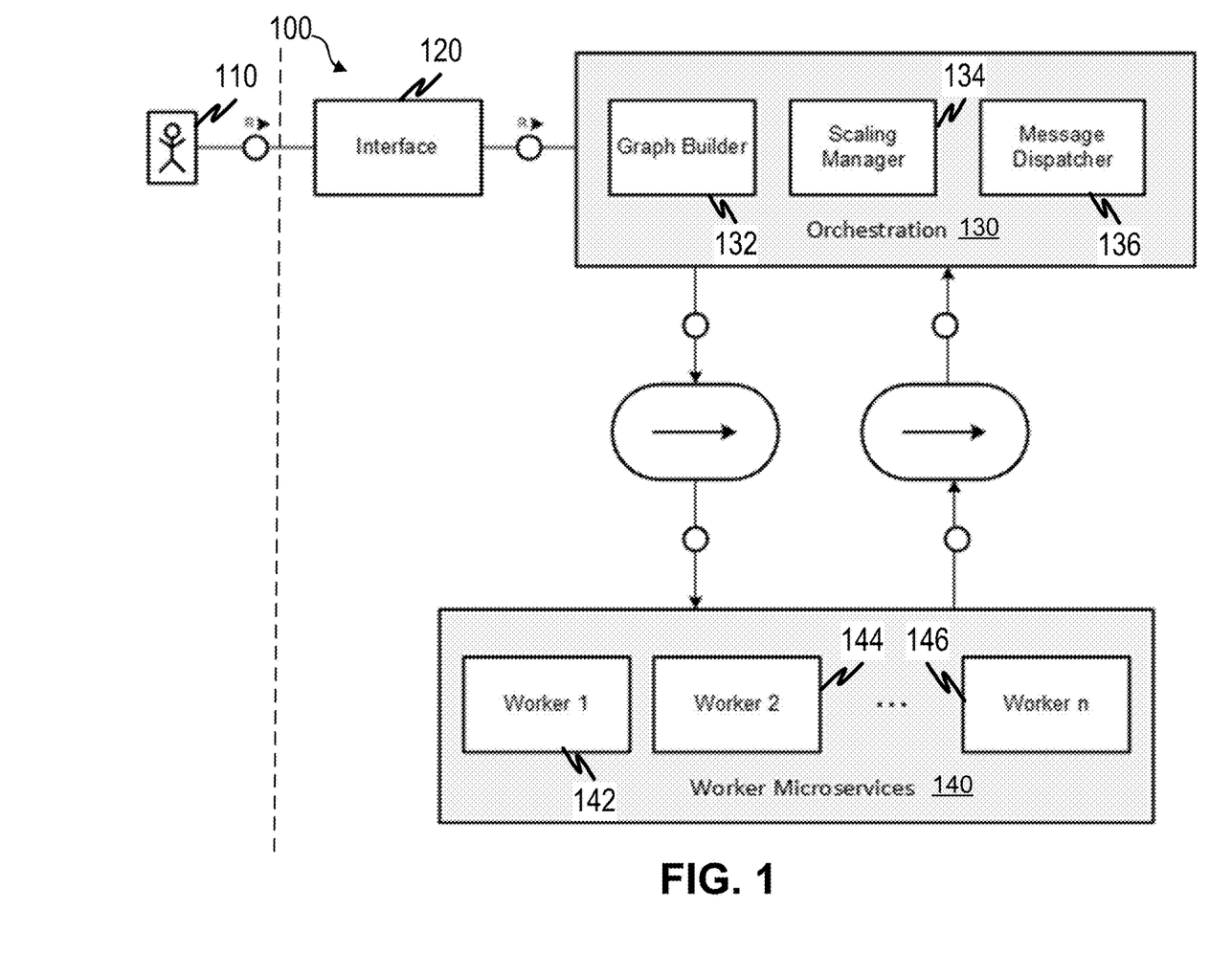
FIG. 1 illustrates an example system architecture for dynamically orchestrating communication within a multi-container architecture.

FIG. 1 illustrates an example system architecture 100 for dynamically orchestrating communication within a multi-container architecture. A user can interface with the system architecture 100 which includes an interface component 120, an orchestration microservice (MSO) 130, and a number of microservices 140 (e.g., worker 1 142, worker 2 144, worker n 146). User 110 can send a request (e.g., to analyze data, generate a prediction based on data, etc.) using an interface component 120. Interface component 120 can be an external facing application program interface (API) such as a graphical user interface that communicates with the MSO 130. The request can be made using a number of inputs, or combination of inputs, such as textual input using a keyboard or touch screen interface, action input by selection of one or more interactive buttons, menus, or scrolling tools displayed on the interface component 120, audio input such as speaking into a microphone coupled with the interface component 120, and the like. MSO 130 can dynamically distribute work or tasks associated with the request among and between workers 142, 144, 146. A request can include one or more tasks (e.g., request parameters) and preconfigured task dependencies, where execution of the one or more tasks can fulfill the request. For example, a request can be to analyze a set of data that can include a task for retrieving the data and a task for analyzing that retrieved data.

MSO 130 is the central component of system architecture 100. MSO 130 can route communication from the interface component 120 to the worker microservices 142, 144, 146. MSO 130 can include a graph builder 132, a scaling manager 134, and a message dispatcher 136. Such communication can utilize, but is not limited to, messages and message queues (e.g., Kafka or Rabbit MQ). In some variations, such communication can utilize representational state transfer (REST) calls or any other messaging infrastructure. The graph builder 132 can receive the request from interface component 120 having the request parameters and preconfigured dependencies. The graph builder 132 can analyze the request and generate a dependency graph as discussed in detail in FIGS. 2-4. With this dependency graph, the graph builder 132 can determine which workers 142, 144, 146 can be involved with executing the request. Based on the workers involved and any interdependencies, message dispatcher 136 can prioritize the workflow to each worker 142, 144, 146. Message dispatcher 136 can determine which worker can commence performance of one or more tasks associated with the request and which worker microservices, if any, have to wait for a predecessor worker microservice to complete performance prior to commencing its own performance. Message dispatcher 136 can make these determinations using the dependency graph. The use of a dependency graph can decentralize the dependency configuration as graph builder 132 can contain logic for generating the dependency graph, but may not communicate directly with the workers.

Message dispatcher 136 can be a communication interface between graph builder 132 and the workers 142, 144, 146. Such communication can be through message traffic. Each worker 142, 144, 146 can contain application logic and perform specific types of tasks (e.g., data analysis, data retrieval, product recommendations, etc.). Each message is sent from a sender to a receiver and can contain a payload with information. Message dispatcher 136 can also receive the request as well as the dependency graph generated by the graph builder 132. Using the request parameters and the dependency graph, message dispatcher 136 can generate and distribute messages to each worker 142, 144, 146. The message can initiate performance of tasks by the workers 142, 144, 146 (e.g., command each worker 142, 144, 146 begin task completion at the appropriate time defined by the graph builder 132). Message dispatcher 136 also received messages from each worker 142, 144, 146 upon the completion of tasks associated with the request.

As previously described, the MSO 130, more specifically message dispatcher 136, knows which workers 142, 144, 146 are involved with a particular request and how many messages are being dispatched to each worker 142, 144, 146. Scaling manager 134 can dynamically scale up or down the number of workers 142, 144, 146 appropriately to ensure the tasks are performed. For example, if the incoming requests require a large number of tasks to be performed by one instance of worker 1 142, scaling manager 134 can instantiate additional instances of worker 1 142 to spread the processing load across the multiple instances. In other words, multiple copies (e.g., instances) worker 142 can be generated and used to execute the tasks. Multiple instances of worker 1 142, in this example, can assist with performing the required workload associated with the request. Scaling manager 134 can optimize the number of workers prior to the load being distributed to each worker by message distributor 136. In other words, the scaling manager 134 can determine an anticipated load of each worker and adjust the number of workers accordingly. Scaling manager 134 can also take into account memory consumption when determining whether to instantiate additional instances of workers 142, 144, 146. With each incoming message, the scaling manager 134 can increase a load counter for each worker 142, 144, 146 to increase the number of instances. After the worker having multiple instances completes its tasks, the load counter can be decreased to scale back down the number of instances of that worker.

By way of illustration, consider a request relating to data analysis. A user 110 can enter in a request to analyze specific data using interface component 120. Interface component 120 can generate a message to MSO 130 that contains the workers involved and any associated dependencies. That message can contain the appropriate workers involved with the task and their inter-dependencies. In this example, worker 1 142 can perform tasks associated with data retrieval, while worker 2 144 can perform tasks associated with analyzing the retrieved data. Worker 1 142 must first retrieve data before worker 2 144 can begin performing data analysis on that data. The message sent to MSO 130 can therefore include that worker 1 142 and worker 2 144 are involved, and worker 2 144 has a dependency on worker 1 142. Graph builder 132 can generate a dependency chart illustrating that dependency. Message dispatcher 146 can send a message to worker 1 142 to initialize data retrieval and hold a message for worker 2 144. Once finished with such retrieval, worker 1 142 can send a message back to message dispatcher 136 with an appropriate output, as described in FIG. 5, that confirms completion of its task. Message dispatcher 136, upon receipt of the message from worker 1 142, can then dispatch a message to worker 2 144 to initialize its task of data analysis. It should be appreciated that this message flow is merely an illustration of one example and should not limit the scope of message traffic and/or types of tasks completed by workers 142, 144, 146.

Figure 2:
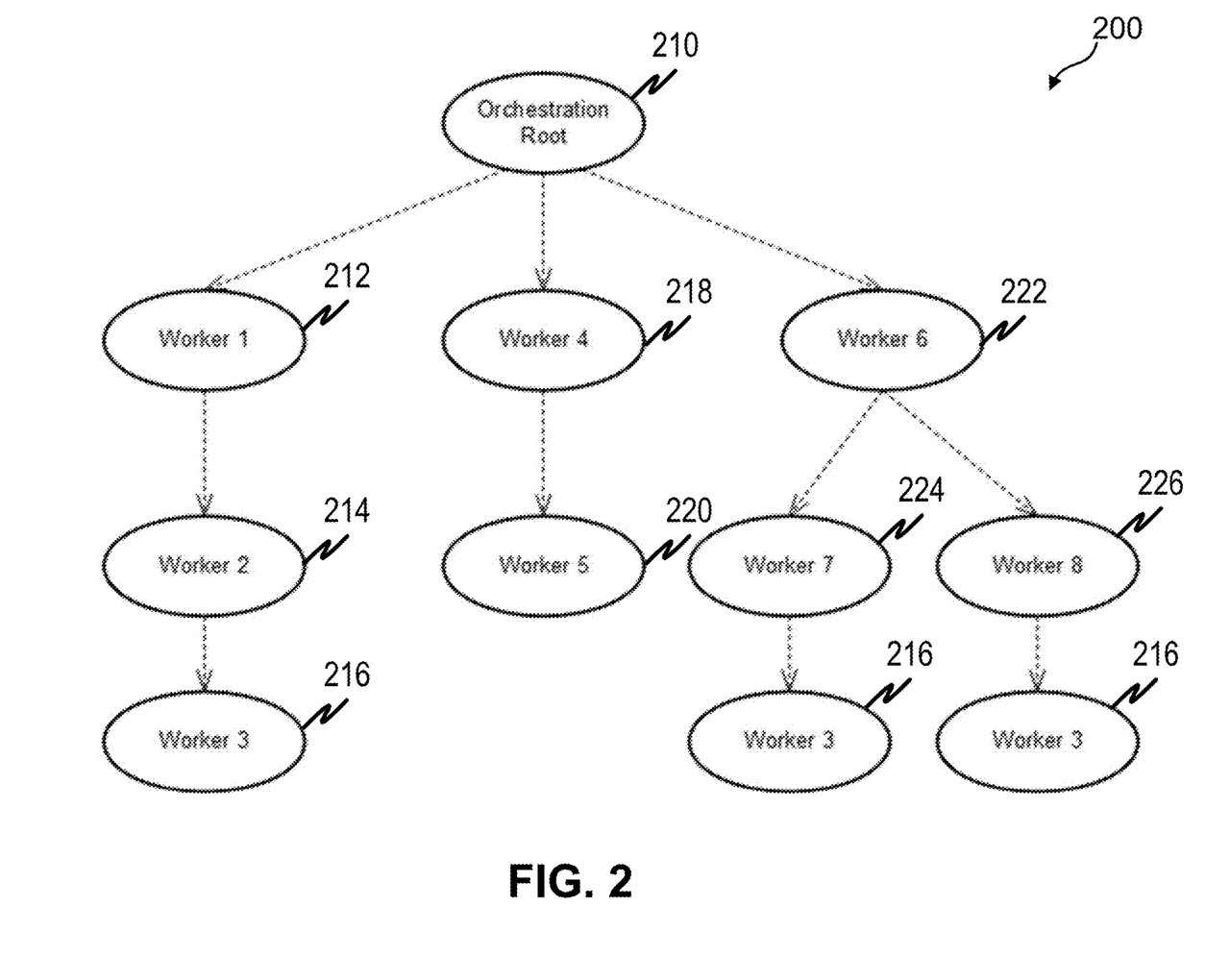
FIG. 2 illustrates an example dependency graph generated by an example graph builder.

FIG. 2 illustrates an example dependency graph 200 generated by graph builder 132. Graph builder 132 can generate dependency graph 200 for each received request from user 110 as well as each incoming message from workers 142, 144, 146. This generation can repeat until only the orchestration root node 210 in the current dependency graph are left to be processed. Dependencies can be split into multiple parallel, sequential, and/or circular paths before eventually reaching the end of processing. The dependency graph 200 can define the various dependencies associated with the workers for each request.

Dependency graph 200 includes a number of nodes 210, 212, 214, 216, 218, 220, 222 224, 226. Each node can represent worker 142, 144, 146. The dependencies between each node can be represented by an arrow. The direction of each arrow can indicate the direction of dependency for the workers. For example, node 214 (e.g., worker 2) has a dependency to node 216 (e.g., worker 3). Node 212 (e.g., worker 1) has a dependency to node 214 (e.g., worker 2). Node 218 (e.g., worker 4) has a dependency to node 220 (e.g., worker 5). Nodes 224 and 226 (e.g., workers 7 and 8, respectively) each have a dependency to node 216 (e.g., worker 3). Node 222 has a dependency to both nodes 224 and 226 (e.g., workers 7 and 8, respectively). Nodes 216 and 220 (e.g., workers 3 and 5, respectively) have no dependencies to any other nodes. Messages from message dispatcher 136 can be initially sent to worker 3 and worker 5 as neither worker has any dependency on any other worker. If worker 3 completes its task before worker 5, worker 3 sends a message to message dispatcher 136 with an appropriate output confirming completion of its task.

Once message dispatcher 136 receives the message from worker 3 that its task is complete, message dispatcher 136 can send a message to graph builder 132. In response, graph builder 132 can generate another dependency graph 300 of FIG. 3 that includes nodes 310, 312, 314, 318, 320, 322, 324, 326, but no longer includes node 216 (e.g., worker 3) as worker 3 has completed it tasks. In the dependency graph 300, node 314 (e.g., worker 2), node 324 (e.g., worker 7), and node 326 (e.g., worker 8) no longer have any dependencies as worker 3 has completed its task and no additional work to perform. Node 320 (e.g., worker 5) also has no dependencies. Message dispatcher 136 can send messages to workers 2, 7, and 8 that it can commence performance of its tasks. Worker 5 can continue executing its tasks as previously instructed by message dispatcher 136.

Figure 3:
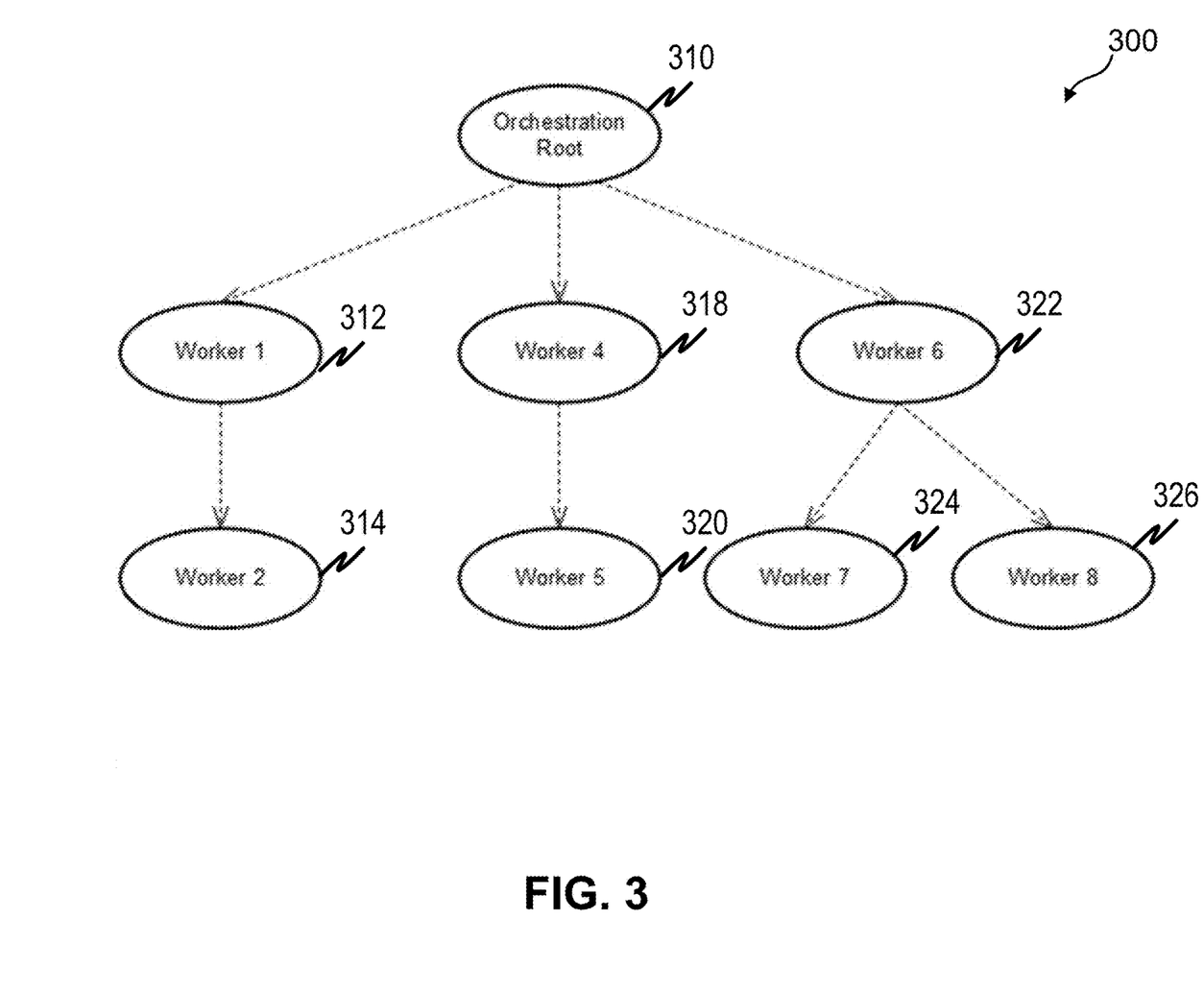
FIG. 3 illustrates another example dependency graph generated by an example graph builder.
Figure 4:
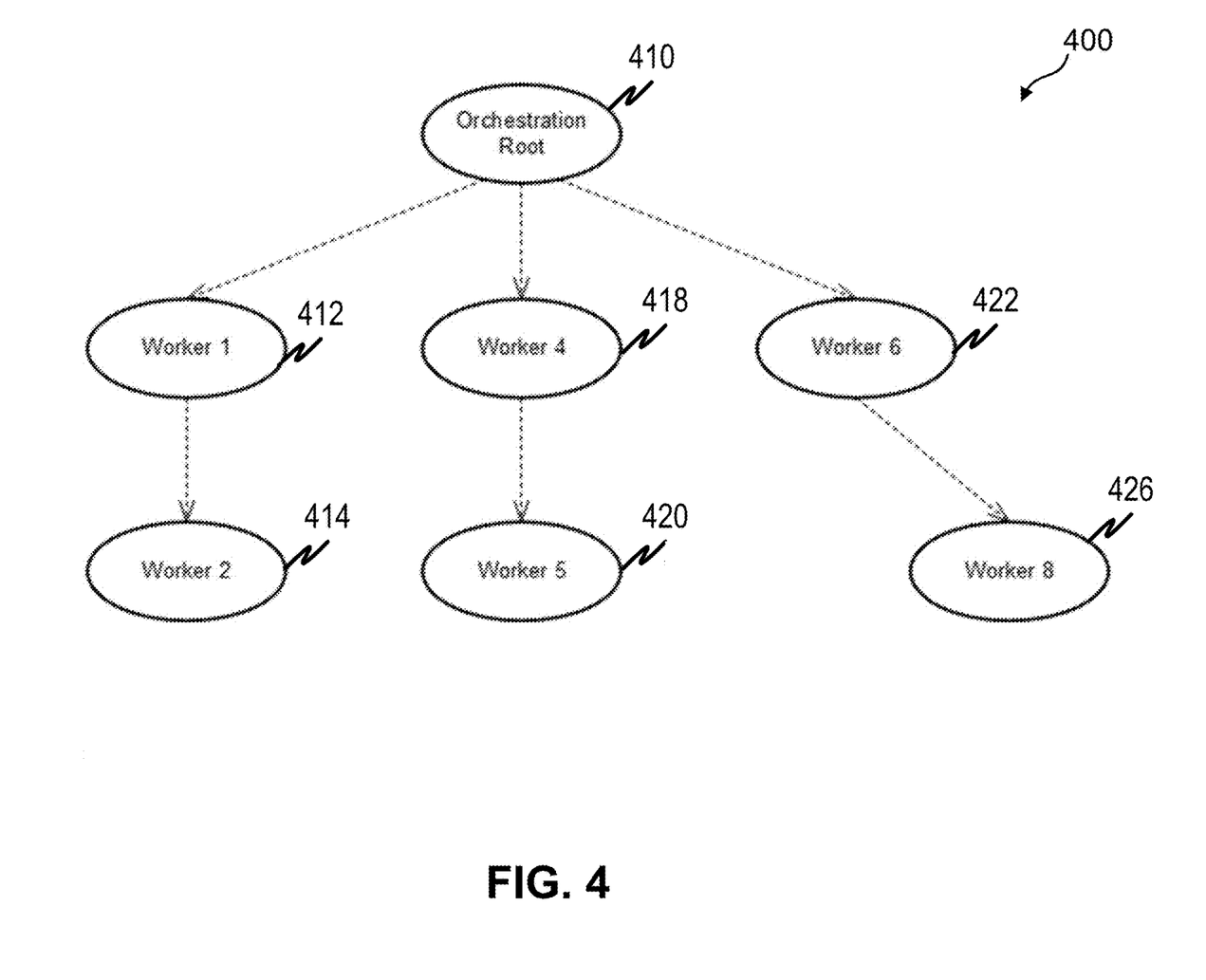
FIG. 4 illustrates another example dependency graph generated by an example graph builder.

FIG. 4 illustrates another example dependency graph 400 generated by graph builder 132. Continuing with the examples described in FIGS. 2-3, after generation of dependency graph 300, worker 7 completes its task and sends a message to message dispatcher 136 containing an output signaling its completion. In response, graph builder 132 generates a new dependency graph 400 including nodes 410, 412, 414, 418, 420, 422, 426, but no longer contains node 324 as worker 7 has completed its task. In this example, workers 2, 5, and 8 are continuing to execute their respective tasks. It is noted that in this example, however, message dispatcher 136 does not send a message to worker 6 to initiate its task as node 422 still has a dependency to node 426 (e.g., worker 8). Message dispatcher 136 can send a message to initiate workflow to worker 6 after worker 8 completes it task and a new dependency graph is generated illustrating that node 422 has no dependencies.

The workflow illustrated in FIGS. 2-4 is for ease of understanding and illustration purposes only. It is recognized that the order in which workers complete tasks can be dependent upon the type of task and/or availability of memory or other computing resources to carry out each task. Upon completion of its task, each worker can separately send a message to message dispatcher 136 with a message containing output signaling its completion. After receipt of each message, message dispatcher 136 can send a request to graph builder 132 to generate a new dependency graph. Graph builder 132 can generate that new dependency graph. The process of re-generating new dependency graphs repeats until only the node 310 (e.g., orchestration root) remains. This indicates that the tasks associated with the request from user 110 have been completed.

Figure 5:
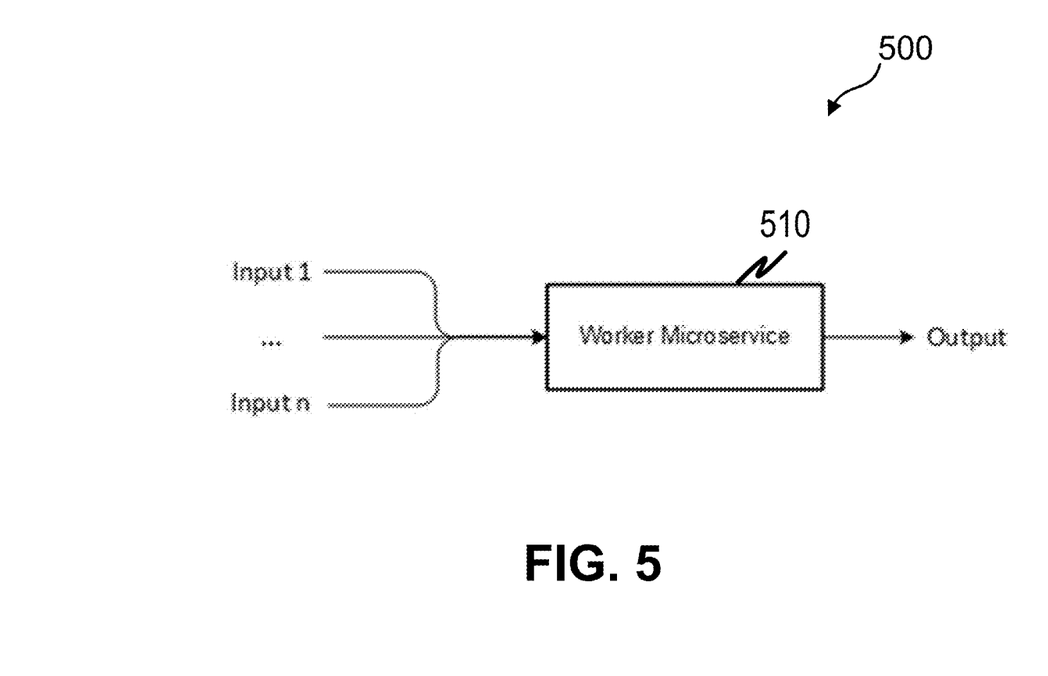
FIG. 5 illustrates an example flow chart of an example worker of worker microservices.

FIG. 5 illustrates an example flow chart 500 of an example worker 510. A worker 510 can be any microservice that performs a piece of work necessary to achieve the goal of a system 100 (e.g., executing a request). The work performed by worker 510 can be part of a sequence of steps that together reflect the system's 100 overall goal and/or capabilities. Each worker 510 can have multiple inputs (e.g., input 1 . . . input n) and a single output. The output generated by worker 510 is the result of the work performed.

In one example, worker 510 can perform a task such as optical character recognition (OCR). The input to worker 510 can be an image. After performing OCR on the input, worker 510 can generate an output of a textual representation of the contents of the input image. If another worker had a dependency on worker 510, such dependency could be the need for the textual representation as an input to generate a different output such as analyzing the contents of the text itself.

Figure 6:
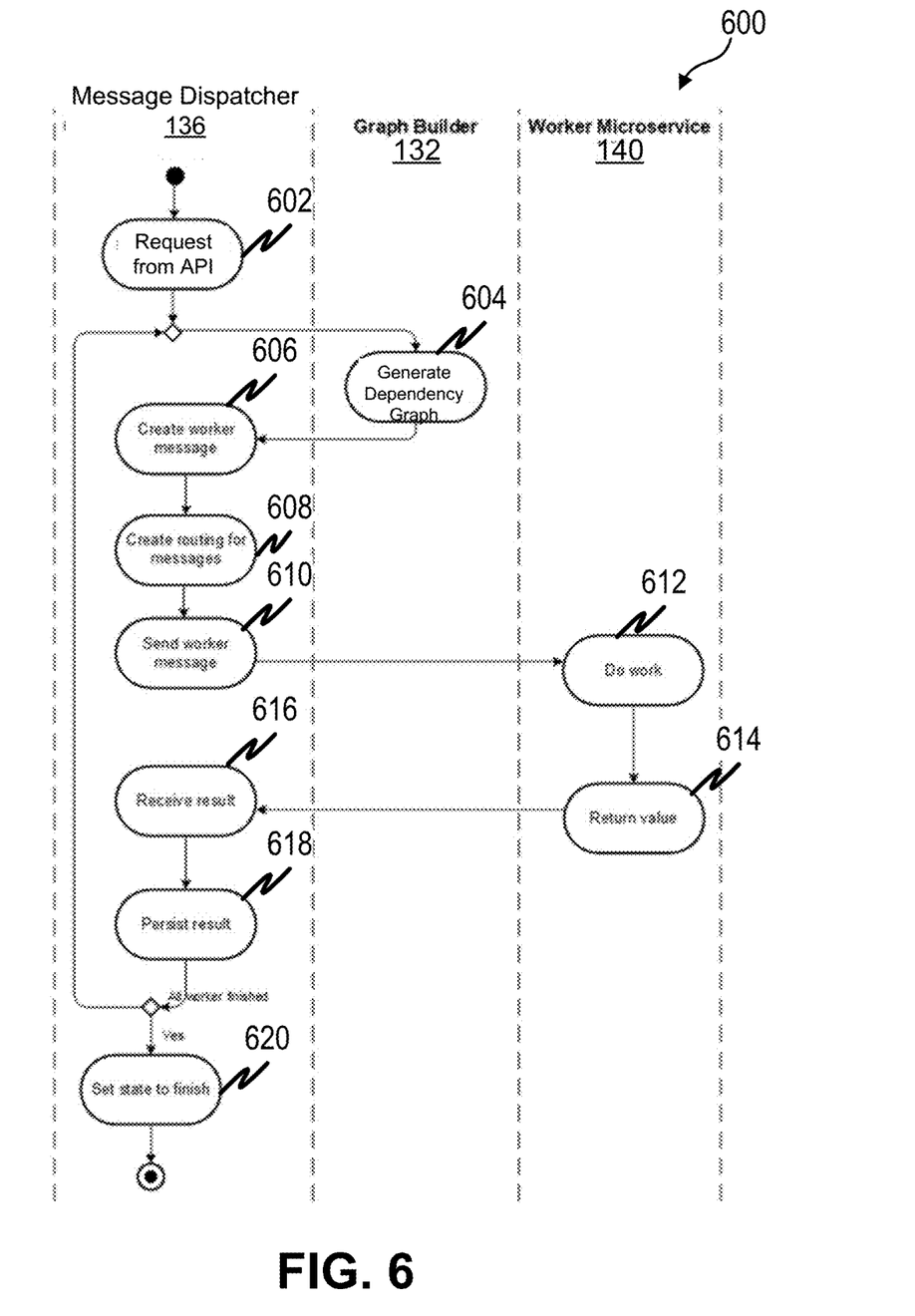
FIG. 6 illustrates an example activity diagram of the process flow within the system architecture of FIG. 1.

FIG. 6 illustrates an example activity diagram 600 of the process flow within system architecture 100. Message dispatcher 136 receives, at 602, a request from the interface component 120 (e.g., API). Message dispatcher 136 communicates with graph builder 132 to generate a dependency graph such as those described in FIGS. 2-4. The graph builder 132 generates, at 604, the dependency graph. Message dispatcher generates, at 606, one or more messages for any workers that are involved in executing the request. Message dispatcher routes, at 608, those generated messages to each individual worker microservice 140 so that the messages reach the appropriate worker. Message dispatcher then sends, at 610, these messages to each appropriate worker 140. After receiving the message to initiate work, the appropriate worker 140 executes its work, at 612, and returns back, at 614, its output (e.g., such as the outputs described in FIG. 5) to message dispatcher 136. Upon receiving the result, at 616, message dispatcher 136 evaluates whether all workers have completed its work (e.g., persist result 618). Such evaluation includes the generation of a new dependency graph as described in detail in FIGS. 2-4. If any nodes other than the orchestration root node 210, 310, 410 are present within the dependency graph, then steps 604-618 are repeated until the only remaining node within the dependency graph is the orchestration root node 210, 310, 410. In other words, the process continues until the workers have completed all tasks (e.g., the request from user 110 has been fulfilled). Once all tasks are complete, the state of the request is set to finish, at 620, and results for the request are returned to the user 110 via interface component 120. The results returned can be dependent upon the particular request made. For example, if a request from user 110 is to generate a prediction, the returned result is that prediction. If the request was associated with data analysis, the returned result can include a summary of the analysis such as numerical metrics.

Figure 7:
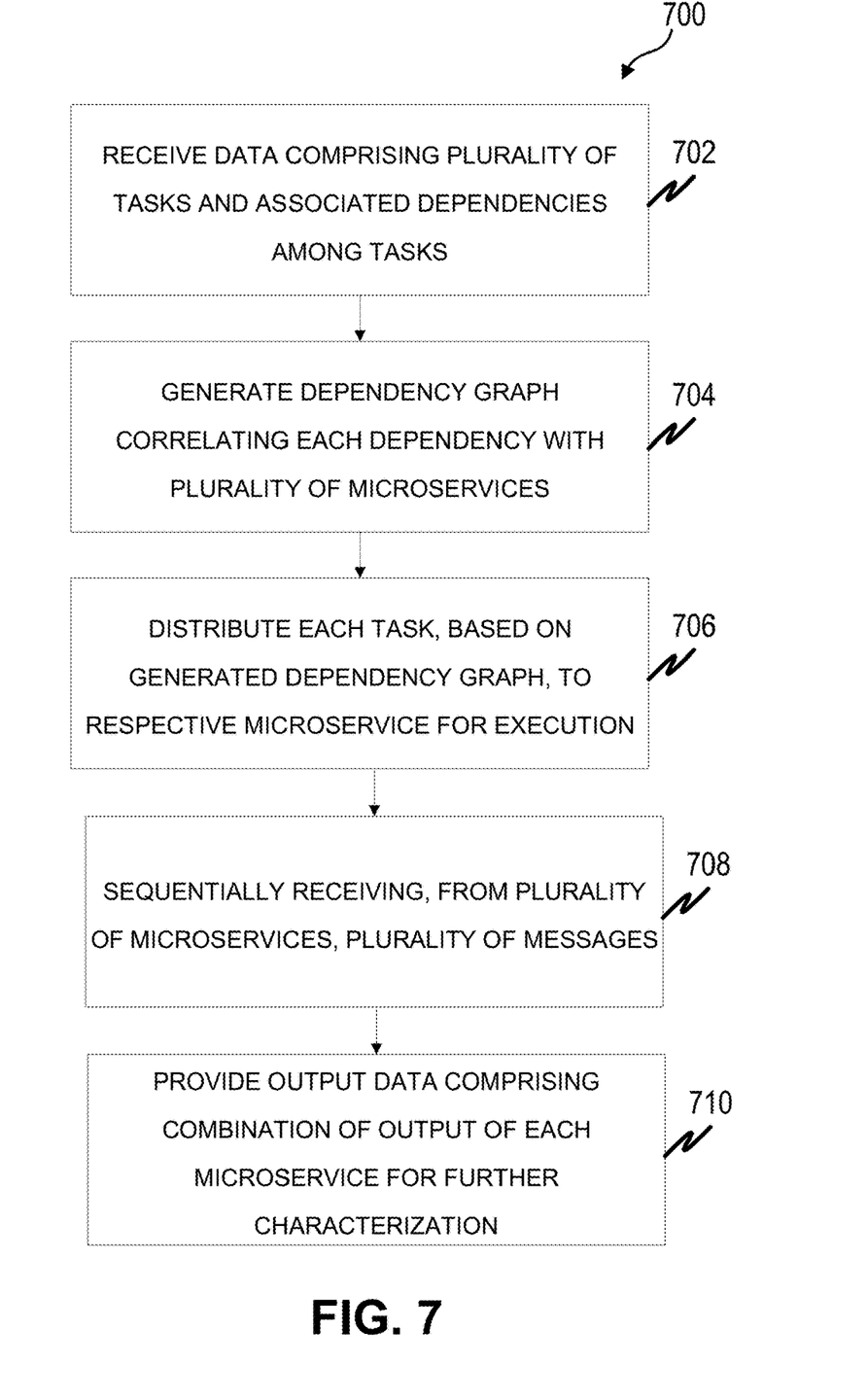
FIG. 7 illustrates an example process flow diagram orchestrating communication between containers or microservices of a multi-container architecture.

FIG. 7 illustrates an example process flow diagram 700 orchestrating communication between containers or microservices of a multi-container architecture. Data from a user having a plurality of tasks and associated dependencies among the plurality of tasks is received, at 702. A dependency graph correlating each dependency of the associated dependencies with a plurality of microservices is generated, at 704. Each microservice is configured to execute a task of the plurality of tasks. Each task is distributed, at 706, based on the generated dependency graph, to a respective microservice for execution. A plurality of messages are sequentially received, at 708, by each microservice. Each message includes an output of each microservices for a respective task. Output data including a combination of the output of each microservice for further characterization is provided, at 710, to a user via a graphical user interface.

In some variations, message dispatcher 136 can expect to receive (e.g., at step 616) a result from worker 140 within a specific timeframe. In other words, there may be a timeout associated with the worker 140. In the event that message dispatcher does not receive back a message within the expected timeframe, scaling manager 134 can dynamically scale up the instances of that particular worker. Such scaling can ensure that the task is completed. The specific timeframe can be based on the complexity of the task it is completing, the available computing power available for the task, and the like.

Figure 8:
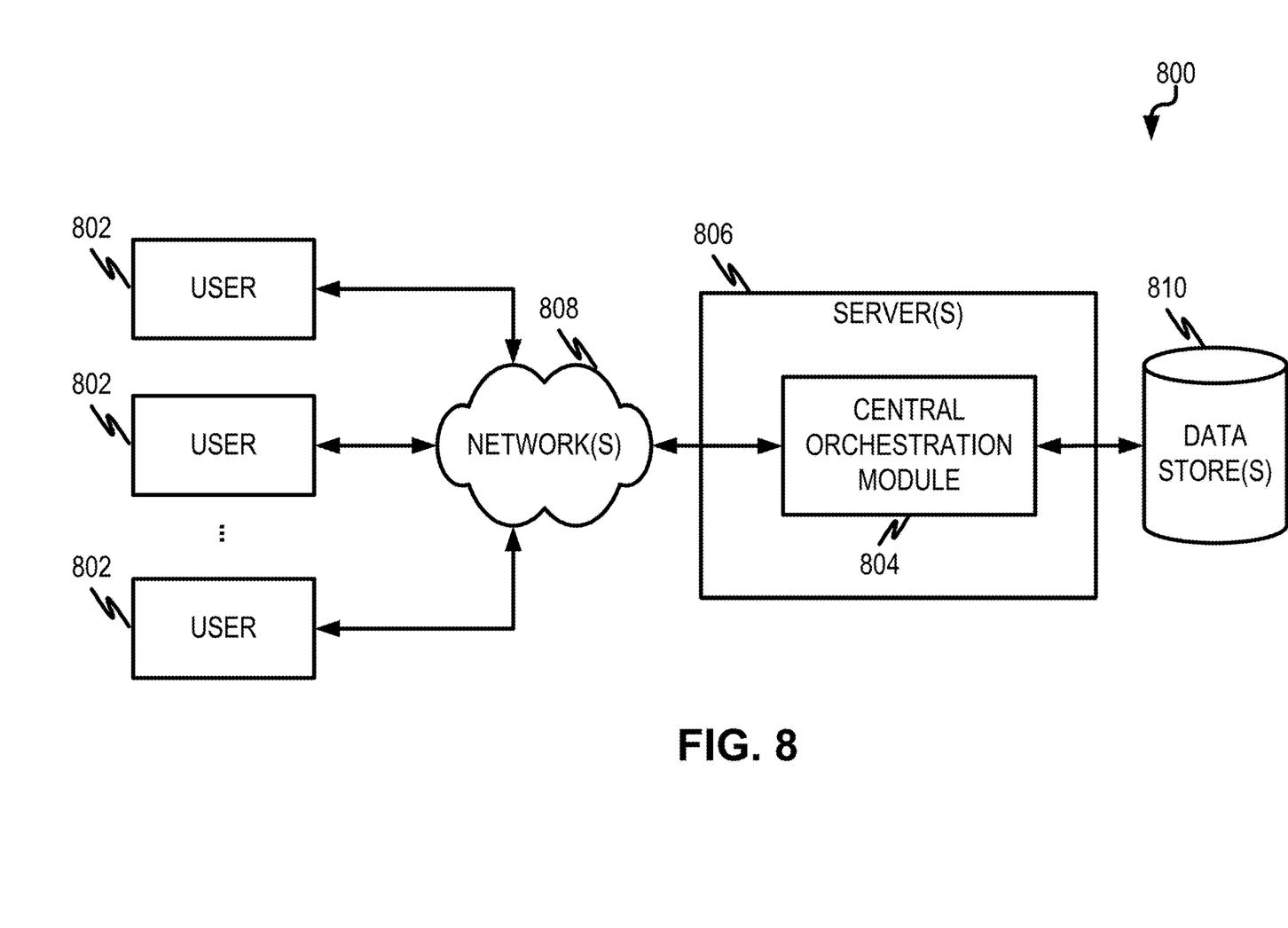
FIG. 8 illustrates an example computer-implemented environment for implementing various aspects described herein.

FIG. 8 illustrates an example computer-implemented environment 800 wherein users 802 can interact with server 806 having central orchestration module 804 for allocating resources as described herein, hosted on one or more servers 806 through a network 808.

As shown in FIG. 8, the users 802 can interact with the central orchestration module 804 through a number of ways, such as over one or more networks 808. One or more servers 806 accessible through the network(s) 808 can host the central orchestration module 804. The one or more servers 806 can also contain or have access to one or more data stores 810 for storing data for the central orchestration module 804.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 9:
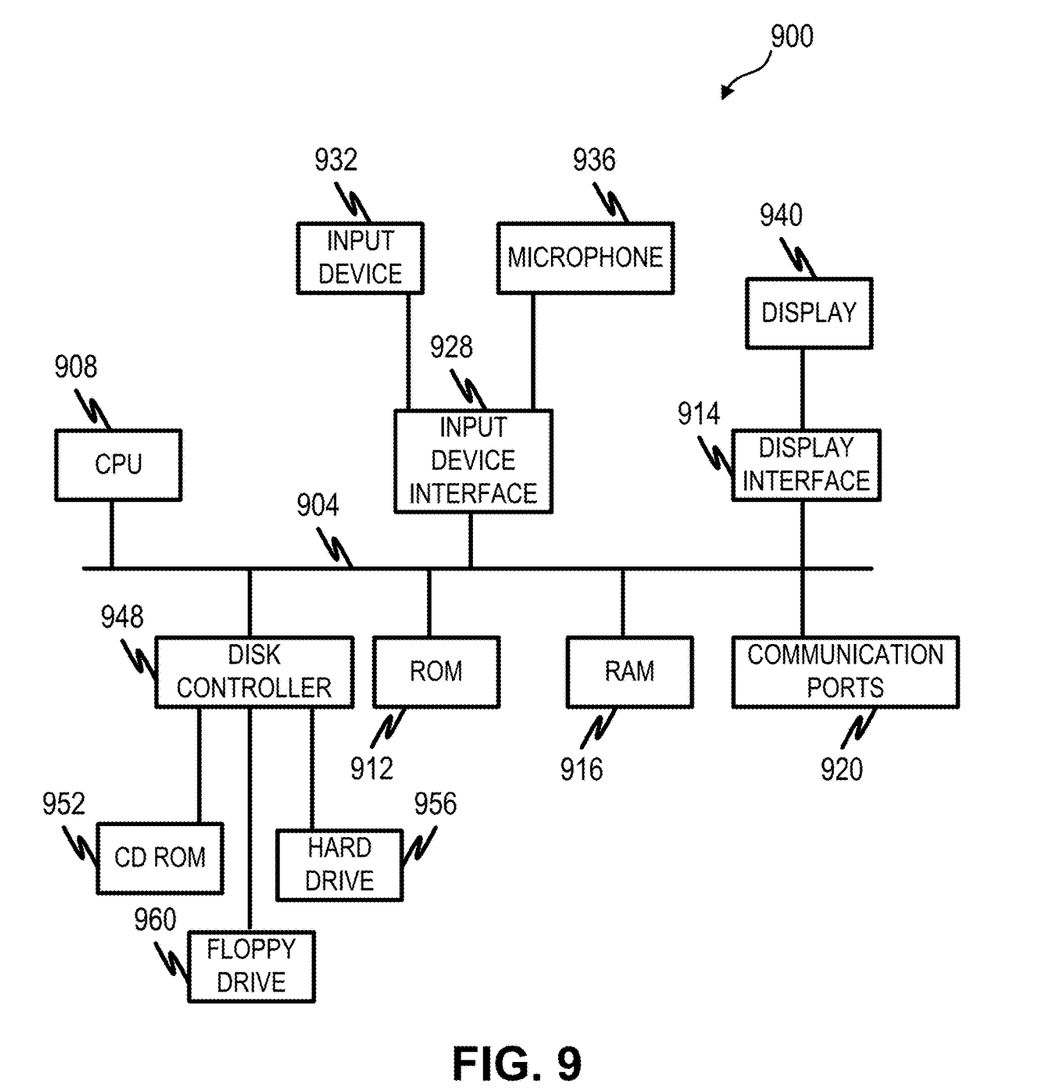
FIG. 9 is a diagram illustrating a sample computing device architecture for implementing various aspects described herein.

FIG. 9 is a diagram 900 illustrating a sample computing device architecture for implementing various aspects described herein. A bus 904 can serve as the information highway interconnecting the other illustrated components of the hardware. A processing system 908 labeled CPU (central processing unit) (e.g., one or more computer processors/data processors at a given computer or at multiple computers), can perform calculations and logic operations required to execute a program. A non-transitory processor-readable storage medium, such as read only memory (ROM) 912 and random access memory (RAM) 916, can be in communication with the processing system 908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 948 can interface one or more optional disk drives to the system bus 904. These disk drives can be external or internal floppy disk drives such as 960, external or internal CD-ROM, CD-R, CD-RW or DVD, or solid state drives such as 952, or external or internal hard drives 956. As indicated previously, these various disk drives 952, 956, 960 and disk controllers are optional devices. The system bus 904 can also include at least one communication port 920 to allow for communication with external devices either physically connected to the computing system or available externally through a wired or wireless network. In some cases, the communication port 920 includes or otherwise comprises a network interface.

To provide for interaction with a user, the subject matter described herein can be implemented on a computing device having a display device 940 (e.g., a CRT (cathode ray tube) or LCD (liquid crystal display) monitor) for displaying information obtained from the bus 904 to the user and an input device 932 such as keyboard and/or a pointing device (e.g., a mouse or a trackball) and/or a touchscreen by which the user can provide input to the computer. Other kinds of input devices 932 can be used to provide for interaction with a user as well; for example, feedback provided to the user can be any form of sensory feedback (e.g., visual feedback, auditory feedback by way of a microphone 936, or tactile feedback); and input from the user can be received in any form, including acoustic, speech, or tactile input. In the input device 932 and the microphone 936 can be coupled to and convey information via the bus 904 by way of an input device interface 928. Other computing devices, such as dedicated servers, can omit one or more of the display 940 and display interface 914, the input device 932, the microphone 936, and input device interface 928.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an un-recited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method executed by one or more data processors of one or more computing devices, the method comprising:
    receiving data comprising a plurality of tasks and associated dependencies among the plurality of tasks;
    generating a dependency graph correlating each dependency of the associated dependencies with a plurality of microservices, wherein each of the plurality of microservices comprises at least one instance of a microservice, and wherein each microservice is configured to execute a task of the plurality of tasks;
    distributing each task, based on the generated dependency graph, to a respective identified microservice that is identified for execution, wherein each of the plurality of microservices receives a portion of the plurality of tasks;
    identifying an overloaded microservice by determining that at least a portion of the plurality of tasks distributed to an instance of least one microservice of the plurality of microservices exceeds operational limits of the at least one microservice;
    in response to the identifying, scaling instances of the overloaded microservice by:
        (i) instantiating additional instances of the overloaded microservice by: creating copies of the overloaded microservice, adding the additional instances to the dependency graph as additional microservices of the plurality of microservices, and distributing the at least a portion of the plurality of tasks across the additional instances; and
        (ii) dynamically removing the additional instances of the overloaded microservice from the generated dependency graph after each respective additional instance completes tasks distributed to the respective additional instance;

sequentially receiving, from the plurality of microservices, a plurality of messages, each message comprising an output of each microservice for a respective task;

providing output data comprising a combination of the output of each microservice for further characterization; and in response to receiving the output data, repeating the generating and distributing for further tasks to complete.

2. The method of claim 1, wherein the generated dependency graph comprises a plurality of nodes, each node representing each microservice.

3. The method of claim 2, further comprising:

determining a first dependency between a first node and a second node of the plurality of nodes, wherein the first node is dependent on the second node; and distributing, at a first time, a task of the plurality of tasks to the second node; and distributing, at a second time after completion of the task by the second node, another task to the first node.

4. The method of claim 1, wherein the scaling further comprises instantiating an additional instance of at least one microservice when an output is not received within a predetermined time period.

5. The method of claim 1, wherein the repeating occurs after receipt of each message is sequentially received from each microservice.

6. The method of claim 1, further comprising: returning results to a user via a user interface once all tasks are completed, wherein the results are dependent on a type of tasks completed.

7. A system comprising:

a message dispatcher processor coupled with at least one non-transitory message dispatcher memory storing computer-executable message dispatcher instructions that when executed by the message dispatcher processor are configured to receive data comprising a plurality of tasks and associated dependencies among the plurality of tasks;

a graph builder processor coupled with at least one non-transitory graph builder memory storing computer-executable graph builder instructions that when executed by the graph builder processor are configured to generate a dependency graph correlating each dependency of the associated dependencies with a plurality of microservices, wherein each of the plurality of microservices comprises at least one instance of a microservice, and wherein each microservice is configured to execute a task of the plurality of tasks, wherein the message dispatcher instructions are further configured to:

(i) distribute each task, based on the generated dependency graph, to an identified microservice that is identified for execution, wherein each of the plurality of microservices receives a portion of the plurality of tasks; (ii) sequentially receive, from the plurality of microservices, a plurality of messages, each message comprising an output of each microservice for a respective task, and (iii) provide output data comprising a combination of the output of each microservice for further characterization; and a scaling manager processor coupled with at least one non-transitory scaling manager memory storing computer-executable scaling manager instructions that when executed by the scaling manager processor are configured to: (i) identify an overloaded microservice by determining that at least a portion of the plurality of tasks distributed to an instance of least one microservice of the plurality of microservices exceed operational limits of the at least one microservice, (ii) in response to the identifying, scale instances of the overloaded microservice by: (a) instantiate additional instances of the overloaded microservice by creating copies of the overloaded microservice, adding the additional instances to the dependency graph as additional microservices of the plurality of microservices, and distribute the at least a portion of the plurality of tasks across the additional instances, and (b) dynamically remove the additional instances of the overloaded microservice from the generated dependency graph after each respective additional instance completes tasks distributed to the respective additional instance;

wherein, in response to receiving the output data, the message dispatcher processor is further configured to repeat the generating and distributing for further tasks to complete.

8. The system of claim 7, wherein the generated dependency graph comprises a plurality of nodes, each node representing each microservice.

9. The system of claim 8, wherein the message dispatcher is instructions are further configured to:

determine a first dependency between a first node and a second node of the plurality of nodes, wherein the first node is dependent on the second node; and distribute, at a first time, a task of the plurality of tasks to the second node; and distribute, at a second time after completion of the task by the second node, another task to the first node.

10. The system of claim 7, wherein the scaling manager instructions are further configured to instantiate an additional instance of at least one microservice when an output is not received within a predetermined time period.

11. The system of claim 7, wherein the repeating occurs after receipt of each message is sequentially received from each microservice.

12. A non-transitory computer program product storing instructions which, when executed by one or more data processors forming part of at least one computing device, implement operations comprising:

receiving data comprising a plurality of tasks and associated dependencies among the plurality of tasks;

generating a dependency graph correlating each dependency of the associated dependencies with a plurality of microservices, wherein each of the plurality of microservices comprises at least one instance of a microservice, and wherein each microservice is configured to execute a task of the plurality of tasks;

distributing each task, based on the generated dependency graph, to an identified microservice that is identified for execution, wherein each of the plurality of microservices receives a portion of the plurality of tasks;

identifying an overloaded microservice by determining that at least a portion of the plurality of tasks distributed to an instance of least one microservice of the plurality of microservices exceed operational limits of the at least one microservice;

in response to the identifying, scaling instances of the overloaded microservice by:

(i) instantiating additional instances of the overloaded microservice by: creating copies of the overloaded microservice, adding the additional instances to the dependency graph as additional microservices of the plurality of microservices, and distributing the at least a portion of the plurality of tasks across the additional instances; and (ii) dynamically removing the additional instances of the overloaded microservice from the generated dependency graph after each respective additional instance completes tasks distributed to the respective additional instance;

sequentially receiving, from the plurality of microservices, a plurality of messages, each message comprising an output of each microservice for a respective task;

providing output data comprising a combination of the output of each microservice for further characterization; and in response to obtaining the output data, repeating the generating and distributing for further tasks to complete.

13. The non-transitory computer program product of claim 12, wherein the generated dependency graph comprises a plurality of nodes, each node representing each microservice and the operations further comprise:

determining a first dependency between a first node and a second node of the plurality of nodes, wherein the first node is dependent on the second node; and distributing, at a first time, a task of the plurality of tasks to the second node; and distributing, at a second time after completion of the task by the second node, another task to the first node.

14. The non-transitory computer program product of claim 12, wherein the scaling further comprises instantiating an additional instance of at least one microservice when an output is not received within a predetermined time period.

15. The non-transitory computer program product of claim 12, wherein the repeating occurs after receipt of each message is sequentially received from each microservice.

* * * * *